E. M. HEYLMAN.
PLANTER.
APPLICATION FILED APR. 28, 1914.
1,110,935.
Patented Sept. 15, 1914.
3 SHEETS—SHEET 1.
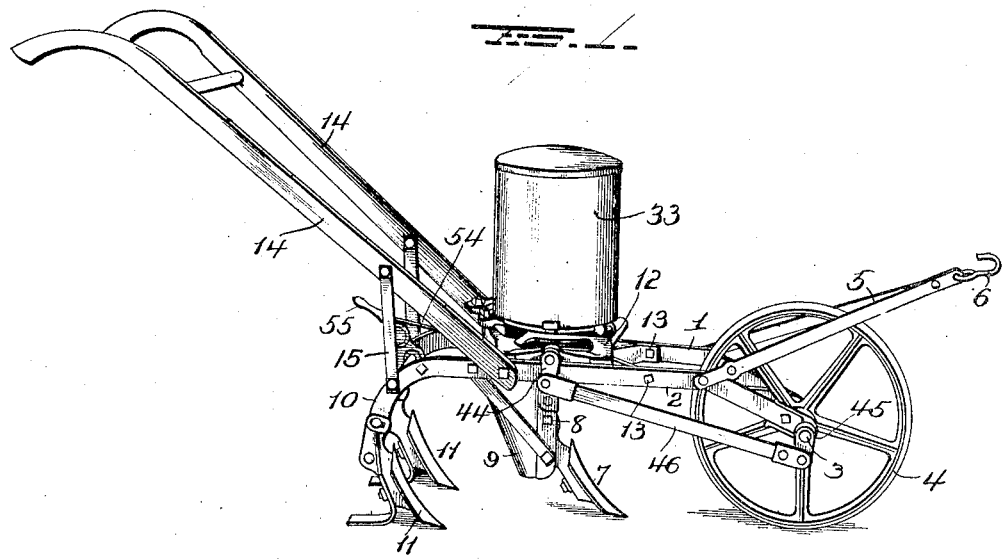
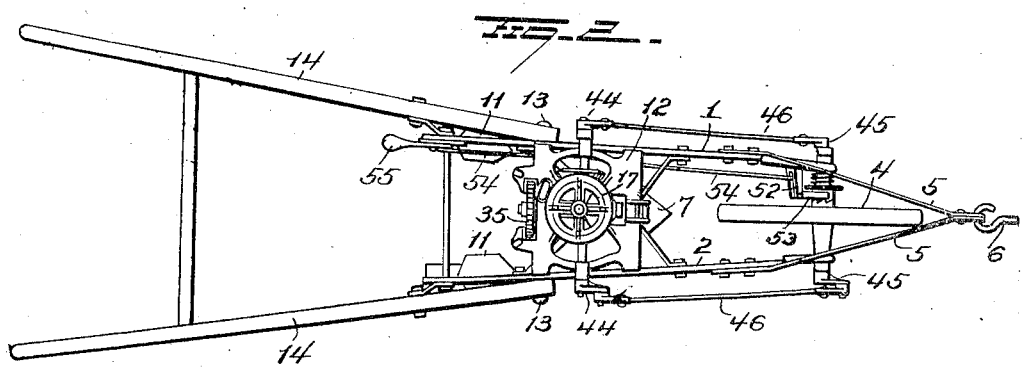
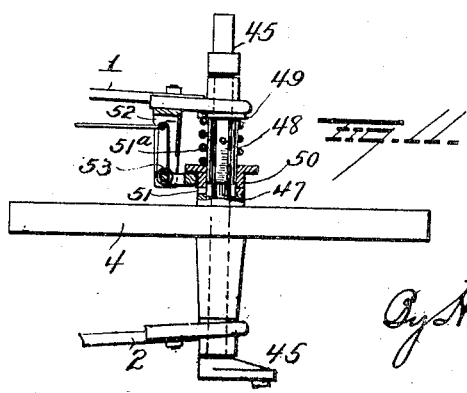
WITNESSES
E. J. Nottingham
G. F. Downing
INVENTOR.
E. M. Heylman
By H. A. Seymour
Attorney

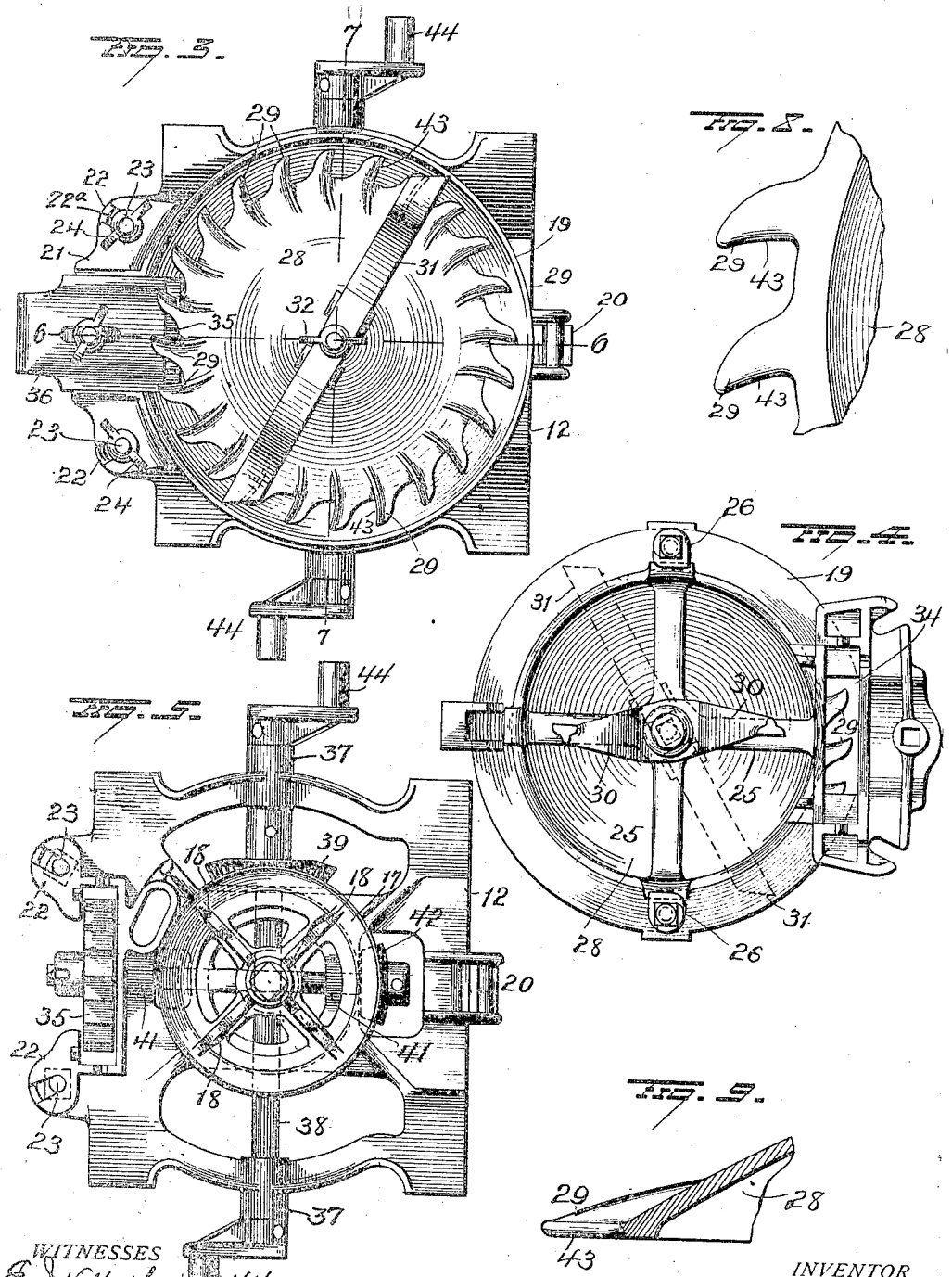

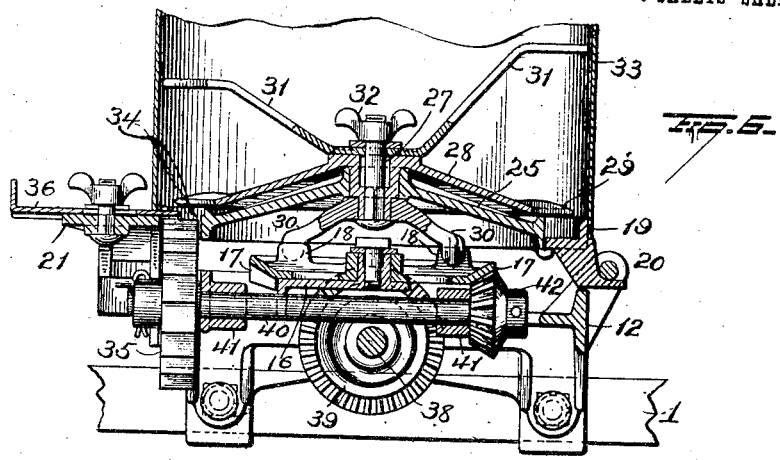
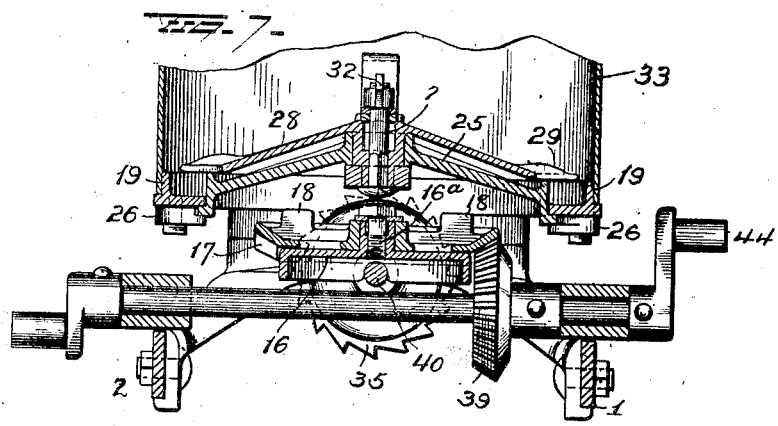
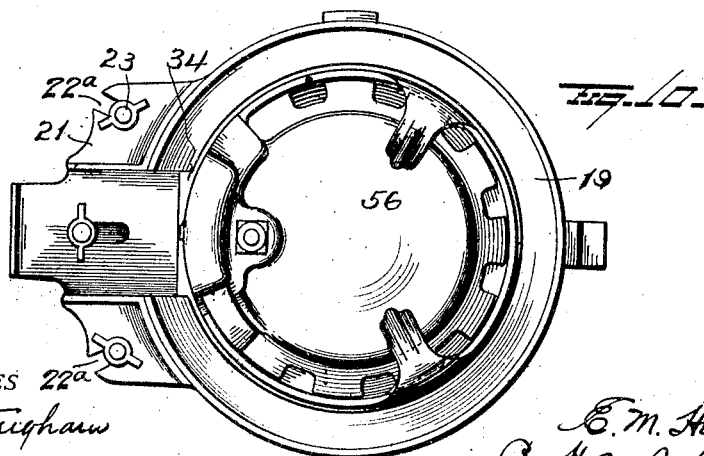

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLANTER.

1,110,935.  Specification of Letters Patent.  Patented Sept. 15, 1914.

Application filed April 28, 1914. Serial No. 834,962.

*To all whom it may concern:*

Be it known that I, EDWARD M. HEYLMAN, of South Bend, in the county of St. Joseph and State of Indiana, have invented certain new and useful Improvements in Planters; and I do hereby declare the following to be a full, clear, and exact description of the invention, such as will enable others skilled in the art to which it appertains to make and use the same.

This invention relates to improvements in planters, such as may be made adaptable for use for planting cotton, corn or peanuts,—one object of the invention being to provide simple and efficient feed actuating mechanism which shall be adaptable for operating interchangeable feed mechanisms.

A further object is to improve the construction and enhance the efficiency of the operation of cotton feeding means.

A further object is to provide simple means for imparting motion from the axle of a walking planter to the feed operating mechanism and also means for easily and accurately stopping and starting said feed operating mechanism without altering or shifting any part of said mechanism *per se*.

With these and other objects in view, the invention consists in certain novel features of construction and combinations of parts as hereinafter set forth and pointed out in the claims.

In the accompanying drawings; Figure 1 is a side elevation of a walking planter embodying my improvements; Fig. 2 is a plan view of the same with the seed can and a portion of the feed mechanism removed; Fig. 3 is an enlarged plan view showing portions of the cotton seed feed devices and the removable ring of can base in which the same are mounted; Fig. 4 is a bottom plan view of the structure shown in Fig. 3; Fig. 5 is a plan view with the base ring and agitator wheel removed; Fig. 6 is a sectional view on the line 6—6 of Fig. 3; Fig. 7 is a sectional view on line 7—7 of Fig. 3; Figs. 8 and 9 are enlarged views showing the form of tooth of said agitator wheel, Fig. 10 is a plan view showing a corn feed mechanism mounted in the removable base ring, and Fig. 11 is a detail view showing the clutch devices on the axle of the traction wheel.

The main frame of the machine comprises beams 1—2 suitably spaced apart and having their forward ends bent downwardly in an inclined direction and mounted loosely near their free forward ends upon an axle 3, the latter passing freely through the hub of a tractor wheel 4. A draft yoke 5 is connected with the forward portions of the frame beams and provided at its free end with a suitable hook or clevis 6. A furrow opener 7 is connected with the main frame by means of a suitable standard 8 and behind the latter, a seed boot 9 is located to receive seed from the feed mechanism hereinafter described. Standards 10 are provided at the rear ends of the beams of the main frame and these standards carry coverers 11.

A rectangular frame 12, made preferably in a single casting, is located between the beams of the main frame and is provided at each side with two seats for the reception of the beams of said main frame, to each of which beams, the frame 12 is securely bolted at each end, as at 13.

Handles 14 are secured to the main frame at the rear end of the frame 12, and the rear bolts 13 may be utilized to secure the forward end of the handles in place, said handles being also connected with the beam standards 10 by means of brace bars 15.

The frame 12 may be termed the base frame for the feeding means and the operating mechanism therefor, and the central portion of this frame is made with a circular mounting 16 and a stud 16ª for a horizontally disposed gear wheel 17. This wheel is provided with upwardly projecting lugs 18 for a purpose hereinafter described.

A removable base ring 19 is hinged at 20 to the base frame 12 and the rear portion of said ring is made with an extension 21 seated upon lugs 22 of the base frame, said extension having open slots 22ª for the reception of bolts 23, the heads of which are loosely mounted in the lugs 22, and upon said bolts, suitable thumb nuts 24 are provided for securing the base ring in place. A spider 25 is disposed within the base ring 19 and held (removably) in place by means of buttons 26. This spider affords a mounting for a centrally located short vertical shaft 27, to the upper end of which a convex agitator disk or wheel 28 having peripheral teeth 29, is secured and to the lower end of said short shaft, arms 30 are fastened and adapted for engagement by two of the lugs 18 on the gear wheel 17 for the purpose of imparting rotary motion to the agitator wheel when said gear wheel 17 is rotated. Agitator arms 31 are secured upon the disk or wheel by a thumb nut 32 screwed upon the upper end of the short shaft 27,—said agitator arms being so bent as to project in an upward direction from the disk 28 and operate to loosen the cotton seed in a seed can 33, removably mounted upon the base ring 19.

The base ring 19 is made with an elongated seed outlet opening 34, and under this opening, a toothed feed wheel 35 is located. A slide valve 36 is mounted upon the extension 21 of the base ring and adapted to be made to project more or less over the toothed feed wheel for regulating the outlet of cotton seed, as hereinafter more fully explained.

The base frame 12 is provided at its sides with bearings 37 for a transverse shaft 38, and to this shaft, a bevel pinion 39 is secured in position to mesh with the gear wheel 17 for imparting motion to the latter. The toothed feed wheel 35 is carried by a shaft 40 disposed at right angles to and in a plane above the shaft 38, said shaft 40 being mounted in bearings 41 in the base frame located respectively in front and in rear of the shaft 38. A pinion 42 (smaller than the pinion 39) is secured to the shaft 40 and receives motion from the horizontal gear wheel 17.

It will be readily seen that by means of this arrangement of gearing above described, motion imparted to the shaft 38 will be transmitted by the pinion 39 to the gear wheel 17 for rotating the toothed agitator wheel or disk 28, and that motion will be transmitted from said gear wheel 17, by means of the small pinion 42 to the shaft 40 and consequently to the toothed feed wheel 35, the latter being thus driven at a greater rate of speed than that of the agitator wheel or axle and in a reverse direction. Such relative speeds of the agitator wheel and the feed will result in a much more accurate drop of the cotton seed than if the feed wheel were permitted to rotate slowly, because when said feed wheel runs slowly, the slide valve 36 which regulates the outlet of seed to the feed wheel must be opened wider than when the feed wheel is rotated rapidly to insure the feeding of the same amount of seed, and when the slide valve is thus opened, the seed will become "bunched" and the subsequent thinning-out of the plants will be rendered tedious and difficult.

Much better results are attained when the feed slide valve 36 is opened just enough to accommodate one seed at a time and by increasing the speed of the feed wheel, it is possible to insure the dropping of a proper amount of seed without bunching the same, but when the feed wheel is thus rapidly rotated, it is difficult, with the use of agitator wheels or disks heretofore employed to insure the entrance of the seed into the notches of the feed wheel with sufficient rapidity. To overcome this defect of prior constructions, I have so shaped the teeth of the agitator wheel or disk that they will operate to force the seed into the notches of the feed wheel. The forward edges of the teeth 29 of the agitator wheel or disk are formed by forwardly curved ribs 43 which are preferably extended partially over the convex upper face of said wheel or disk. The teeth of the agitator wheel or disk are thus so shaped that they will operate to force the seed toward the inside edge of the feed wheel, and the under sides of said teeth are beveled and rounded off so as to force the seed down into the notches of the feed wheel.

The driving shaft 38 of the feed-operating mechanism, is provided at its respective ends with crank arms 44—44 disposed 90° apart and at respective ends of the axle 3, crank arms 45—45 are similarly secured. The crank arms 44 are connected with the crank arms 45 by means of pitmen 46—46. By thus providing crank arms at both ends of the axle connected with crank arms at both ends of the driving shafts and arranging the crank arms of the respective pairs 90° apart, danger of dead centers will be avoided; the wear and side thrust of the movable parts in their bearings will be reduced to a minimum, and the tendency of the machine to run sidewise with constructions employing single crank-and-pitman connections, will be obviated.

One end of the hub of the traction wheel 4 is made with a clutch member 47 and between this end of the hub and the beam 1 of the main frame, a sleeve 48 having angular exterior faces, is secured to the axle and provided at one end with a fixed collar or flange 49. A flanged collar 50 made with a clutch member 51 is mounted to slide on the angularly-faced sleeve 48 and a spring 51ᵃ is disposed between the fixed flange or collar 49 and the movable flanged collar 50 to force the clutch member 51 into locked engagement with the clutch member 47 on the hub of the traction wheel. In this manner the traction wheel is locked to the axle so that motion will be transmitted from the latter to the feed operation mechanism as previously explained.

A bracket 52 projects inwardly from the frame beam 1 and in this bracket, a bell crank 53 is mounted. One arm of this bell-crank is bifurcated and spans the flanged clutch collar 50 for shifting the same to release the clutch member 51 from the clutch member 47. The other arm of the bell-crank is connected by a rod 54 with a foot lever 55 pivotally attached to the rear portion of the main frame. By pressing this foot lever, the clutch member 51 will be operated as above described, and when the foot lever has been pressed sufficiently to cause the pivotal connection of the rod 54 therewith, to pass the pivotal connection of said lever to the frame, the clutch will be locked in released position.

In order to convert machine from a cotton to a corn planter, all that is necessary is to raise the base ring 19; remove the spider 25 and agitator disk and arms, and then mount a corn feeding mechanism 56 in said base ring 19, as shown in Fig. 10.

To adapt the machine for planting peanuts, the corn feeding mechanism may be displaced in the base ring 19 by a feed mechanism especially adapted for feeding peanuts.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is—

1. In a planter, the combination with a main frame, of a base frame secured thereto, a horizontal gear wheel mounted on the base frame, a base ring, a toothed agitator disk mounted on said base ring, driving connections between said gear wheel and agitator disk a driving shaft mounted in the base frame, a pinion secured to said shaft and meshing with the gear wheel, a second shaft mounted in the base frame in a different horizontal plane from that of the driving shaft, a feed wheel on said second shaft, and a pinion on said second shaft meshing with said gear wheel, said last-mentioned pinion being smaller than the first-mentioned pinion, whereby the feed-wheel will be driven at greater speed than that of the agitator disk.

2. In a planter, the combination with a base frame, of a base frame, a shaft mounted therein, a feed wheel on said shaft, means for rotating said shaft and feed wheel rapidly, a horizontal agitator wheel having teeth movable over the feed wheel, each of said teeth having a curved forward edge and a beveled lower face, and means for rotating said agitator disk.

In testimony whereof, I have signed this specification in the presence of two subscribing witnesses.

EDWARD M. HEYLMAN.

Witnesses:
 EDWIN NICAR,
 KATE E. BUCKLEY.